Patented May 8, 1934

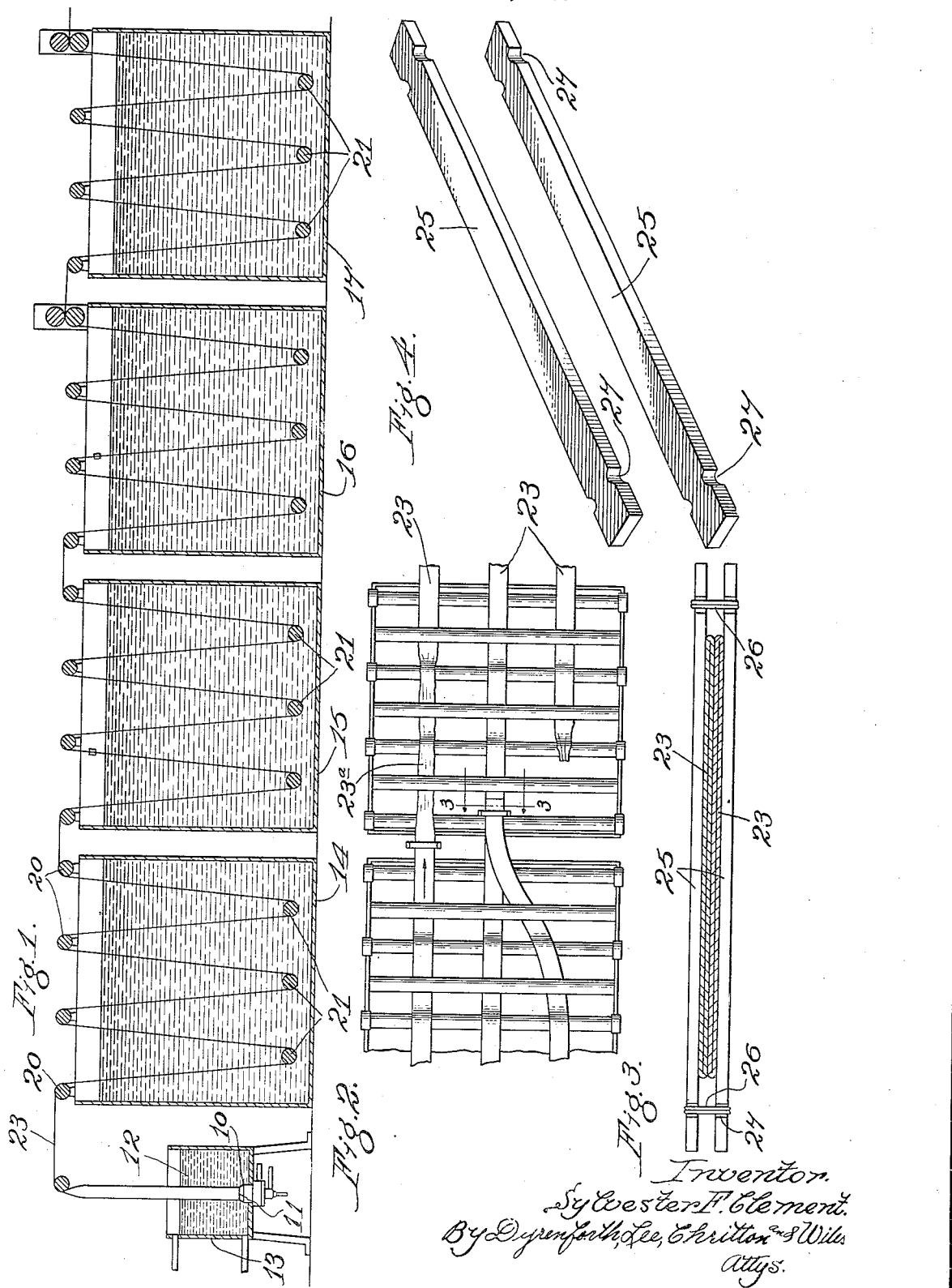

1,958,181

UNITED STATES PATENT OFFICE

1,958,181

APPARATUS FOR PRODUCING TUBING OR THE LIKE

Sylvester F. Clement, Chicago, Ill., assignor to The Visking Corporation, Chicago, Ill., a corporation of Virginia Application December 19, 1930, Serial No. 503,605

1 Claim. (Cl. 18—57)

The invention relates to apparatus for producing tubing, or the like, and is particularly adapted to be embodied in apparatus for producing cellulose tubing which is to be employed as sausage casings.

Briefly, cellulose tubing may be manufactured by extruding viscose through an annular orifice into coagulating and regenerating baths, after which the tubing is washed in water and treated with a softening agent. The several baths are held in tanks or receptacles, and rollers are provided for advancing the tubing through the tanks or receptacles. At times, the tubing tends to wrinkle or fold as it passes over the rollers and is thereby rendered unfit for commercial purposes.

The primary object is to provide means for preventing the tubing from wrinkling or folding as it passes through the coagulating, regenerating and washing baths, and also to provide improved means for securing one length of tubing to an adjacent length of tubing so that the adjacent length may thread the first mentioned length through the baths.

Other objects and advantages of the invention will become apparent as the following detailed description progresses, reference being had to the accompanying drawing, wherein:

Figure 1 is a somewhat diagrammatic longitudinal section taken through apparatus for producing cellulose tubing.

Fig. 2 is a fragmentary plan view of the apparatus shown in Fig. 1.

Fig. 3 is a section taken on line 3—3 of Fig. 2, and

Fig. 4 is a perspective view of a pair of sticks which embody the invention.

Referring for the present to Figs. 1 and 2 of the drawing wherein apparatus for producing cellulose tubing is illustrated, the reference character 10 designates generally apparatus for extruding viscose through an annular orifice 11 into a coagulating or regenerating bath 12 which is held in a receptacle 13. The tubing thus formed is advanced through a plurality of tanks 14, 15, 16 and 17. The tank 14 holds a regenerating bath and the tanks 15 and 16 hold water in which the tubing is washed. The tank 17 holds a softening agent which is preferably an aqueous solution of glycerine.

The means for advancing the tubing through the tanks comprises driven rollers 20 positioned above the tanks, idler rollers 21 being provided at the bottom of the tank. The tubing, which is indicated at 23, is threaded over the rollers 20 and 21 and passes over these rollers in a flat condition. In practice, a plurality of extruding mechanisms 10 is associated with each set of tanks 14 to 17, inclusive, so that a plurality of tubes 23 are advanced simultaneously through the tanks (see Fig. 2).

As set forth above, the tubing 23 tends to wrinkle or fold so that it becomes unfit for commercial purposes. Thus, a wrinkled piece of tubing is indicated at 23a in Fig. 2. To correct this condition, a pair of flat sticks 25 is provided, the tubing being stretched out flat between the sticks which are then clamped to the tubing by means of rubber bands 26, or the equivalent. (See Fig. 3.) It will be noted that the sticks 25 are provided with notches 27 to receive the rubber bands 26. These sticks 25 hold the tubing flat and pass over the rollers 20 and 21 without injuring the tubing.

The sticks 25 are also employed to secure one length of tubing 23 to an adjacent length of tubing when the first length is to be threaded through the apparatus. Thus, if one of the lengths of tubing 23 is severed, the free end coming from the extruding apparatus 10 is secured in a flat condition to the adjacent length of tubing, as shown in Fig. 2. The sticks 25 hold both lengths of tubing flat and prevent wrinkling or folding of either of the tubes 23.

While the invention is disclosed in connection with apparatus for producing cellulose tubing, it is to be understood that it may be embodied in apparatus for producing ribbons of cellulose, or other material.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible, in view of the prior art.

What I claim as new, and desire to secure by Letters Patent, is:

The method of drawing cellulose tubing in flat unwrinkled condition through a treating bath apparatus of the devious or sinuous type, consisting in drawing a plurality of lengths of the tubing parallel to each other through said apparatus, and in case of breakage of any length attaching its end to another length intermediate the ends of the latter length so that it may be drawn by and with the other length through the apparatus, maintaining both of said tubes in a flat condition where they are attached to each other.

SYLVESTER F. CLEMENT.